United States Patent
Oyama

(10) Patent No.: US 12,001,202 B2
(45) Date of Patent: Jun. 4, 2024

(54) VEHICLE CONTROL SYSTEM AND VEHICLE

(71) Applicant: TOYOTA JIDOSHA KABUSHIKI KAISHA, Toyota (JP)

(72) Inventor: Keisuke Oyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 397 days.

(21) Appl. No.: 17/471,487

(22) Filed: Sep. 10, 2021

(65) Prior Publication Data
US 2022/0083053 A1    Mar. 17, 2022

(30) Foreign Application Priority Data

Sep. 15, 2020   (JP) ................................ 2020-154278

(51) Int. Cl.
  *G05D 1/00*    (2024.01)
  *B60R 25/24*   (2013.01)
  *H04W 4/40*    (2018.01)

(52) U.S. Cl.
  CPC ......... *G05D 1/0022* (2013.01); *B60R 25/243* (2013.01); *G05D 1/0016* (2013.01);
  (Continued)

(58) Field of Classification Search
  CPC ............... G05D 1/0022; G05D 1/0016; G05D 2201/0213; B60R 25/243;
  (Continued)

(56) References Cited

U.S. PATENT DOCUMENTS

| 2016/0148450 A1* | 5/2016 | Ohshima ............... H04W 12/06 340/5.61 |
| 2017/0178035 A1* | 6/2017 | Grimm ................... H04L 67/12 |

(Continued)

FOREIGN PATENT DOCUMENTS

| DE | 102020108622 A1 * | 10/2020 | ............. B60W 30/06 |
| DE | 102020119080 A1 * | 1/2021 | ......... G07C 9/00309 |
| JP | 2016-097927 A | 5/2016 | |

OTHER PUBLICATIONS

Machine Translation of DE-102020108622-A1 (Year: 2020).*

(Continued)

*Primary Examiner* — James J Lee
*Assistant Examiner* — Alexander George Matta
(74) *Attorney, Agent, or Firm* — Sughrue Mion, PLLC

(57) ABSTRACT

A vehicle control system comprises a portable terminal and a vehicle including a communication device and a drive device. When the drive device is in a non-actuation state and the communication device is in an inactivated state, the vehicle changes a state of the communication device from the inactivated state to an activated state when an activation condition is satisfied. The activation condition is satisfied when a user holding legitimate qualification exists within a communication possible range. When the drive device is in the non-actuation state, the vehicle changes the state of the communication device from the activated state to the inactivated state when an activation stop condition is satisfied. The activation stop condition is satisfied when an activation period in which the communication device is in the activated state reaches a predetermined period.

4 Claims, 11 Drawing Sheets

(52) U.S. Cl.
CPC ......... *H04W 4/40* (2018.02); *B60R 2325/202* (2013.01); *B60R 2325/205* (2013.01)

(58) Field of Classification Search
CPC ....... B60R 2325/202; B60R 2325/205; H04W 4/40; H04W 4/021; H04W 4/023; H04W 4/024
See application file for complete search history.

(56) References Cited

U.S. PATENT DOCUMENTS

| | | |
|---|---|---|
| 2018/0144566 A1 | 5/2018 | Ohshima |
| 2019/0248331 A1* | 8/2019 | Salah ................... G01S 5/0284 |
| 2020/0236494 A1* | 7/2020 | Ronan .................... B60R 25/24 |
| 2022/0083052 A1 | 3/2022 | Oyama |

OTHER PUBLICATIONS

Machine Translation of DE-102020119080-A1 (Year: 2021).*
Office Action issued Sep. 21, 2023 by the United States Patent and Trademark Office in U.S. Appl. No. 17/470,149.
WKYC Channel 3, "Tesla car drives itself through parking lots with 'Smart Summon' feature", Youtube, 2019, https://www.youtube.com/watch?v=BtZIR2OY-RI (1 page total).
BuddsChev, "How to use Remote Start", Youtube, 2017, https://www.youtube.com/watch?v=9yuqZMkZ88Y (1 page total).

* cited by examiner

VEHICLE CONTROL SYSTEM AND VEHICLE

TECHNICAL FILED

The present disclosure relates to a vehicle control system, which includes a portable terminal and a vehicle, and is configured to cause the vehicle to automatically travel to a target position in accordance with an operation on the portable terminal by a user existing outside the vehicle, and to a vehicle, which is configured to automatically travel to a target position in accordance with an operation on a portable terminal by a user existing outside the vehicle.

BACKGROUND

Hitherto, there has been known a vehicle control system configured to allow a user existing outside a vehicle to operate a portable terminal (for example, a smartphone or a portable tablet terminal) to cause the vehicle to automatically travel to a target position. The control of the vehicle through use of the portable terminal is also referred to as "remote operation control" for the sake of convenience.

For example, the vehicle control system described in Japanese Patent Application Laid-open No. 2016-97927 (hereinafter referred to as "related-art system") allows execution of the remote operation control when matching of both of an electronic key of a vehicle and a portable terminal are successful.

SUMMARY

The vehicle includes a communication unit (a communication device) for communicating with the portable terminal. The communication unit is configured to be enabled to communicate with the portable terminal when the communication unit is in an activated state, and to be disabled to communicate with the portable terminal when the communication unit is in an inactivated state. When a drive source (drive device) of the vehicle is in an actuation state, "an in-vehicle battery configured to supply electric power to the communication unit" is being charged. When the drive source is in a non-actuation state, the in-vehicle battery is not charged. When the drive source is in the non-actuation state, it is desired that the communication unit be in the inactivated state so that the communication unit does not wastefully consume the electric power. However, when the communication unit is in the inactivated state, it is required for the user to execute a certain operation in order to change the state of the communication unit to the activated state before the user executes an operation relating to the remote operation control on the portable terminal.

The related-art system does not consider a timing for changing the state of the communication unit from the inactivated state to the activated state. In a case in which the timing for the change is too late, even when the user operates the portable terminal, the vehicle cannot detect the operation, and thus the user may feel a sense of discomfort. Meanwhile, when the timing for the change is too early, the communication unit wastefully consumes the electric power.

Further, the operation relating to the remote operation control may not be executed after the state of the communication unit is changed from the inactivated state to the activated state. In this case, when the state of the communication unit is maintained in the activated state, the communication unit wastefully consumes the electric power.

The present disclosure has been made in view of the above-mentioned problem. That is, an object of the present disclosure is to provide a vehicle control system capable of changing a state of a communication unit from an inactivated state to an activated state at an appropriate timing when remote operation control is to be executed, and preventing the communication unit from wastefully consuming electric power when the remote operation control is not executed after the communication unit is activated.

A vehicle control system (hereinafter referred to as "system of the present disclosure"), according to at least one embodiment of the present disclosure comprises:

a portable terminal (27) to be operated by a user; and
a vehicle (VA), which includes a communication device (25) configured to be enabled to wirelessly communicate with the portable terminal when the communication device is in an activated state, and to be disabled to wirelessly communicate with the portable terminal when the communication device is in an inactivated state, and a drive device (42a) configured to be enabled to generate a driving force when the drive device is in an actuation state, and to be disabled to generate the driving force when the drive device is in a non-actuation state, the vehicle being configured to change, when a predetermined startup condition is satisfied in a case in which the drive device is in the non-actuation state, a state of the drive device from the non-actuation state to the actuation state, and to automatically travel to a predetermined target position in accordance with a movement instruction received by the communication device from the portable terminal.

The portable terminal is configured to transmit the movement instruction when a predetermined movement operation is executed by the user (Step 360).

When the drive device is in the non-actuation state and the communication device is in the inactivated state, the vehicle is configured to monitor whether an activation condition is satisfied, the activation condition being satisfied when a user holding legitimate qualification for driving the vehicle exists within a predetermined communication possible range, which is outside the vehicle, and in which a distance from the vehicle is shorter than a predetermined distance (Step 510, Step 515, Step 520), and to activate the communication device to change a state of the communication device from the inactivated state to the activated state when the activation condition is satisfied (Step 535).

When the drive device is in the non-actuation state, the vehicle is configured to monitor whether an activation stop condition is satisfied, the activation stop condition being satisfied when an activation period in which the communication device is in the activated state reaches a predetermined period (Step 605, Step 610, Step 620), and to stop the activation of the communication device to change the state of the communication device from the activated state to the inactivated state (Step 625) when the activation stop condition is satisfied ("Yes" at Step 620).

With the system according to the present disclosure, in the case in which a drive device is in the non-actuation state when the activation condition, which is satisfied when the user (legitimate user) holding the legitimate qualification for driving the vehicle exists within the communication possible range, is satisfied, the state of the communication device is changed to the activated state. When the user is to operate the portable terminal to start the control (remote operation control) of causing the vehicle to travel to the target position, there is a high possibility that the user approaches the vehicle so that the user exists within the predetermined distance from the vehicle, and then operates the portable terminal. In this case, the activation condition is satisfied, and the state of the communication device is changed to the activated state. When the communication between the vehicle and the portable terminal is required, the communication device can thus be maintained in the activated state, and it is possible to reduce a possibility that the user who is to execute the remote operation control feels a sense of discomfort caused by the state in which the user cannot execute the remote operation control. Further, the communication device is maintained in the inactivated state until the activation condition is satisfied, and it is thus possible to reduce a frequency (occasions) of the wasteful consumption of the electric power by the communication device when the drive device is in the non-actuation state.

Further, with the system according to the present disclosure, when the activation period reaches the predetermined period, the activation stop condition is satisfied, and the activation of the communication device is stopped. When the state of the drive device is not changed to the actuation state before the activation period reaches the predetermined period, the possibility that the user starts the remote operation control is low. In this case, the activation of the communication device is stopped, and it is thus possible to reduce the frequency of the wasteful consumption of the electric power by the communication device when the drive device is in the non-actuation state.

In one aspect of the system of the present disclosure, the vehicle is configured to inhibit the activation of the communication device even when the activation condition is satisfied after the activation stop condition is satisfied ("No" at Step 530).

According to this aspect, the communication device is not activated even when the user who is less likely to start the remote operation control stays within the communication possible range after the activation stop condition is satisfied. As a result, it is possible to reduce the frequency of the wasteful consumption of the electric power by the communication device when the drive device is in the non-actuation state.

In the above description, the system of the present disclosure further comprises an electronic key (26) configured to transmit, without an operation of the user, an electronic key wireless signal including a key identifier assigned in advance.

The vehicle is configured to:
receive the electronic key wireless signal when the electronic key exists within the communication possible range even when the communication device is in the inactivated state;
determine, when the communication device is in the inactivated state and the electronic key wireless signal is received, whether the key identifier included in the electronic key wireless signal matches a vehicle unique identifier stored in advance (Step 515); and
determine that the activation condition is satisfied when the key identifier and the vehicle unique identifier are determined to match each other (Step 535).

According to this aspect, the state of the communication device can be changed to the activated state by only bringing about the state in which there exists the user carrying the electronic key having the set key identifier matching the vehicle unique identifier within the communication possible range. As a result, it is possible to determine, without requiring a special operation by the user who has approached the vehicle, whether or not the user is a legitimate user. When the user is a legitimate user, the state of the communication device can be changed to the activated state. Further, the user can cause the vehicle to execute the remote operation control by only operating the portable terminal without being required to operate the electronic key. Consequently, the user can smoothly cause the vehicle to execute the remote operation control without switching the held electronic key to the portable terminal.

In the above description, the electronic key is configured to transmit a specific electronic key wireless signal when a predetermined operation is executed by the user (Step 330).

The vehicle is configured to activate the communication device to change the state of the communication device from the inactivated state to the activated state when the specific electronic key wireless signal is received after the activation stop condition is satisfied (Step 825).

According to this aspect, even when the user intends to start the remote operation control, but the drive device is not changed to the actuation state before the activation period reaches the predetermined period, the user can activate the communication device only through the predetermined operation on the electronic key. As a result, even when the activation of the communication device is temporarily stopped, the user can start the remote operation control while staying outside the vehicle.

In one aspect of the system of the present disclosure, the vehicle is configured to reset the activation period when the predetermined startup condition is satisfied and the state of the drive device is changed from the non-actuation state to the actuation state (Step 725, Step 940).

The activation period is reset when the state of the drive device is changed to the actuation state, and the activation period can thus accurately be counted.

In one aspect of the system of the present disclosure, the portable terminal is configured to transmit a startup instruction when a predetermined startup operation is executed by the user (Step 342).

The vehicle includes, inside the vehicle, a startup switch (28) to be operated by the user.

The vehicle is configured to determine that the predetermined startup condition is satisfied when any one of a condition that the communication device receives the startup instruction ("Yes" at Step 710) and a condition that the startup switch is operated is satisfied in the case in which the drive device is in the non-actuation state ("Yes" at Step 905, "Yes" at Step 910).

With this configuration, the user can change the state of the drive device to the actuation state from the inside of the vehicle and from the outside of the vehicle.

A vehicle (VA) according to at least one embodiment of the present disclosure comprises:
a communication device (25) configured to be enabled to wirelessly communicate with a portable terminal when the communication device is in an activated state, and to be disabled to wirelessly communicate with the portable terminal when the communication device is in an inactivated state;
a drive device (42*a*) configured to be enabled to generate a driving force when the drive device is in an actuation state, and to be disabled to generate the driving force when the drive device is in a non-actuation state; and
a control device (20, 30) configured to change, when a predetermined startup condition is satisfied in a case in which the drive device is in the non-actuation state, a state of the drive device from the non-actuation state to the actuation state, and to cause the vehicle to automatically travel to a predetermined target position in accordance with a movement instruction, which is transmitted by the portable terminal when a predetermined operation is executed on the portable terminal, and is received by the communication device.

When the drive device is in the non-actuation state and the communication device is in the inactivated state, the control device is configured to monitor whether an activation condition is satisfied, the activation condition being satisfied when a user holding legitimate qualification for driving the vehicle exists within a predetermined communication possible range, which is outside the vehicle, and in which a distance from the vehicle is shorter than a predetermined distance (Step 510, Step 515, Step 520), and to activate the communication device to change a state of the communication device from the inactivated state to the activated state when the activation condition is satisfied (Step 535).

When the drive device is in the non-actuation state, the control device is configured to monitor whether an activation stop condition is satisfied, the activation stop condition being satisfied when an activation period in which the communication device is in the activated state reaches a predetermined period (Step 605, Step 610, Step 620), and to stop the activation of the communication device to change the state of the communication device from the activated state to the inactivated state (Step 625) when the activation stop condition is satisfied ("Yes" at Step 620).

With the vehicle according to the present disclosure, when the communication between the vehicle and the portable terminal is required, the communication device can be maintained in the activated state, and it is possible to reduce a possibility that the user who is to execute the remote operation control feels a sense of discomfort caused by the state in which the user cannot execute the remote operation control. The communication device is maintained in the inactivated state until the activation condition is satisfied, and it is thus possible to reduce a frequency of the wasteful consumption of the electric power by the communication device when the drive device is in the non-actuation state. Further, when the state of the drive device is not changed to the actuation state before the activation period reaches the predetermined period, the activation of the communication device is stopped, and it is thus possible to reduce the frequency of the wasteful consumption of the electric power by the communication device when the drive device is in the non-actuation state.

In the above description, for easier understanding of the present disclosure, the terms and/or reference symbols used in at least one embodiment described below are enclosed in parentheses and assigned to the components of the present disclosure corresponding to the at least one embodiment. However, the constituent elements of the present disclosure are not limited to the at least one embodiment defined by the terms and/or reference symbols. Other objects, other features, and accompanying advantages of the present disclosure are easily understandable from the description of the at least one embodiment of the present disclosure to be given with reference to the following drawings.

DESCRIPTION OF THE EMBODIMENTS

<Configuration>

Figure 1:
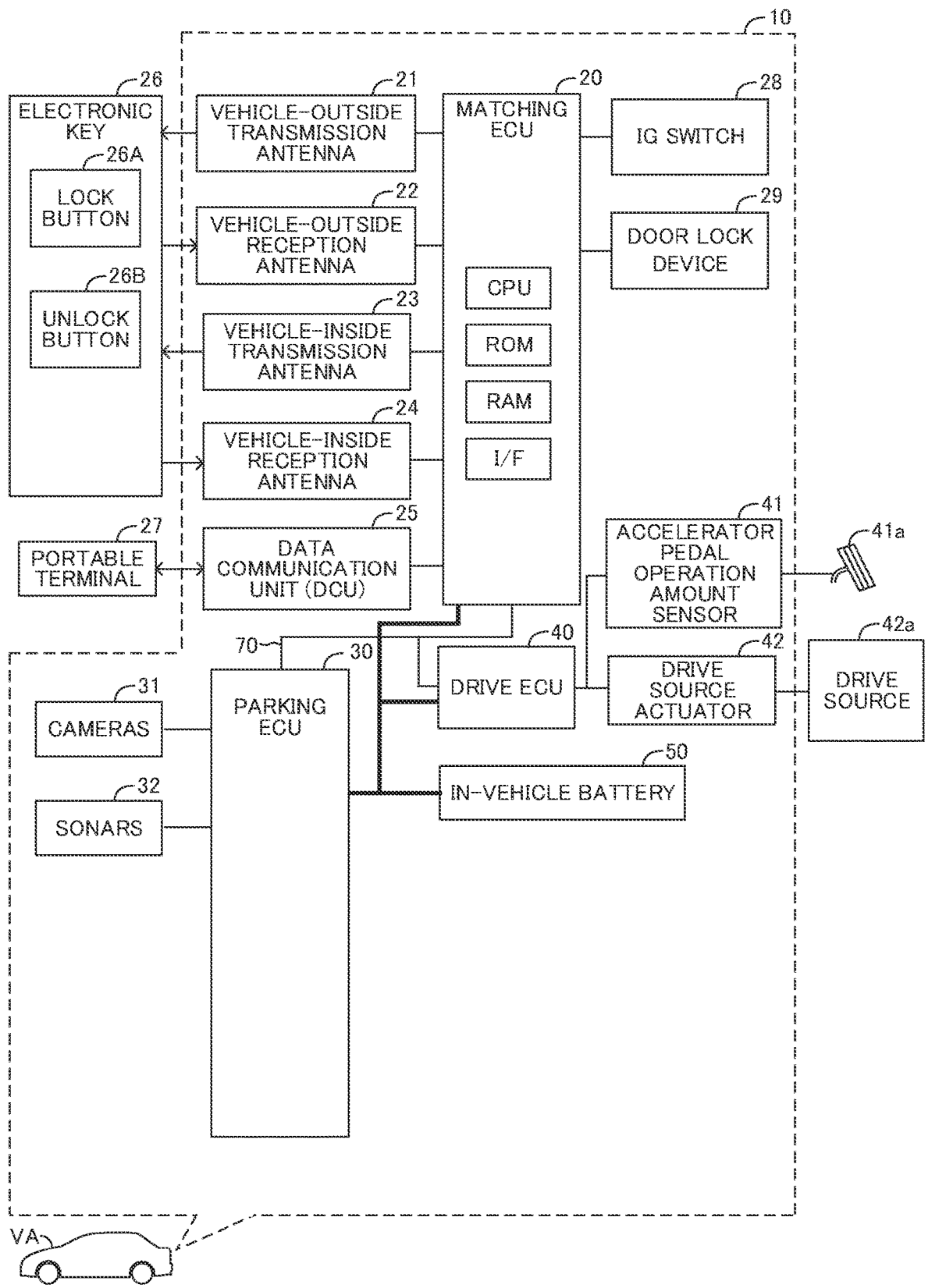
FIG. 1 is a schematic configuration diagram of a vehicle control system according to an embodiment of the present disclosure.

As illustrated in FIG. 1, a vehicle control system according to an embodiment of the present disclosure includes a vehicle control device 10 (hereinafter referred to as "the present control device 10") mounted (applied) to a vehicle VA, an electronic key 26, and a portable terminal 27.

The present control device 10 includes a matching ECU 20, a parking ECU 30, and a drive ECU 40. These ECUs 20, 30, and 40 are connected to each other for mutually transmitting and receiving data through a controller area network (CAN) 70.

ECU is an abbreviation for an electric control unit. The ECU is an electronic control circuit including a microcomputer as a main component. The microcomputer includes, for example, a CPU, a ROM, a RAM, and an interface. The CPU executes instructions (routines) stored in the memory (ROM) to implement various functions. All or some of the above-mentioned ECUs 20, 30, and 40 may be integrated into one ECU.

The present control device 10 includes a vehicle-outside transmission antenna 21, a vehicle-outside reception antenna 22, a vehicle-inside transmission antenna 23, a vehicle-inside reception antenna 24, and a data communication unit (hereinafter referred to as "DCU," and sometimes referred to as "communication unit", "communication device", and "communication module") 25. These components are connected to the matching ECU 20.

The vehicle-outside transmission antenna 21 is an antenna configured to transmit a predetermined wireless signal (for example, a request signal) toward the outside of the vehicle VA (vehicle-outside). The vehicle-outside reception antenna 22 is an antenna configured to receive a wireless signal (for example, response signal) transmitted from a device present outside the vehicle. The vehicle-inside transmission antenna 23 is an antenna configured to transmit a predetermined wireless signal (for example, the request signal) toward the inside of the vehicle VA (vehicle-inside). The vehicle-inside reception antenna 24 is an antenna configured to receive a wireless signal (for example, the response signal) transmitted from a device present inside the vehicle.

The electronic key 26 is a key for the vehicle VA, is carried by a driver (user) of the vehicle VA, and is used, for example, when a door (not shown) of the vehicle VA is to be locked and unlocked. When the electronic key 26 receives the request signal from the vehicle VA through the wireless communication, the electronic key 26 transmits, through the wireless communication, a response signal (electronic key wireless signal) including a key ID (hereinafter sometimes referred to as "key identifier") being an identifier assigned in advance to the electronic key 26. When the electronic key 26 exists within a communication possible range, which is outside the vehicle, and in which the distance from the vehicle VA is shorter than a predetermined distance, and the communication can be executed with the vehicle-outside transmission antenna 21 and the vehicle-outside reception antenna 22, the electronic key 26 receives the request signal transmitted from the vehicle-outside transmission antenna 21, and transmits the response signal in response to the request signal. Meanwhile, when the electronic key 26 is present inside the vehicle, the electronic key 26 receives the request signal transmitted from the vehicle-inside transmission antenna 23, and the vehicle-inside reception antenna 24 receives the response signal transmitted by the electronic key 26.

The electronic key 26 includes a lock button 26A and an unlock button 26B to be operated by the user. When the lock button 26A is operated, the electronic key 26 transmits a lock signal including the key ID through the wireless communication. When the unlock button 26B is operated, the electronic key 26 transmits an unlock signal including the key ID through the wireless communication.

The matching ECU 20 is configured to transmit the request signal toward the outside of the vehicle and the inside of the vehicle. Further, the matching ECU 20 is configured to be capable of receiving the response signal from the electronic key 26. When the matching ECU 20 receives the response signal, the matching ECU 20 identifies through which of the vehicle-outside reception antenna 22 and the vehicle-inside reception antenna 24 the response signal is received. When the response signal is received through the vehicle-outside reception antenna 22, the matching ECU 20 determines that the electronic key 26 that has transmitted the response signal is present outside the vehicle. When the response signal is received through the vehicle-inside reception antenna 24, the matching ECU 20 determines that the electronic key 26 that has transmitted the response signal is present inside the vehicle. The matching ECU 20 determines whether or not the key ID included in the received response signal matches a vehicle unique ID (vehicle unique identifier) being an identifier set to the vehicle VA in advance. That is, the matching ECU 20 executes key matching, and communicates a result thereof with other ECUs through the CAN 70.

When the DCU 25 is in the activated state, and the wireless communication connection has not been established, the DCU 25 is configured to search for a device of a connection destination, and to establish, when a retrieved device is a device registered (paired) in advance, the wireless communication connection with the device. When the portable terminal (for example, a smartphone or a portable tablet) 27 being a communication device carried by the user has been registered to the DCU 25 in advance, and the DCU 25 is activated, and founds the portable terminal 27, the wireless communication connection is established between the DCU 25 and the portable terminal 27. When the wireless communication connection is established, data communication can be executed between the DCU 25 and the portable terminal 27. The DCU 25 communicates with the portable terminal 27 through widely-known near field communication (for example, Bluetooth (trademark)). When the DCU 25 is in the inactivated state, no wireless connection is established, and the DCU 25 does not search for a device being the connection destination, and cannot thus communicate with the portable terminal 27.

Further, the present control device 10 includes an ignition (IG) switch (also referred to as "startup switch" or "ready switch") 28. The IG switch 28 is connected to the matching ECU 20.

Further, the present control device 10 includes a door lock device 29. The door lock device 29 locks and unlocks a door (not shown) of the vehicle VA. When the matching ECU 20 receives the lock signal from the electronic key 26, and the key ID included in the received lock signal and the vehicle unique ID match each other, the matching ECU 20 causes the door lock device 29 to lock the door. When the matching ECU 20 receives the unlock signal from the electronic key 26, and the key ID included in the received unlock signal and the vehicle unique ID match each other, the matching ECU 20 causes the door lock device 29 to unlock the door.

Further, the present control device 10 includes a plurality of cameras 31 and a plurality of sonars 32. The cameras 31 and the sonars 32 are connected to the parking ECU 30.

The plurality of cameras 31 include a front camera, a rear camera, a left side camera, and a right side camera. Each of the plurality of cameras 31 takes an image of a region described below to generate image data each time a predetermined period elapses, and transmits the image data to the parking ECU 30. The front camera takes an image of a region on a front side of the vehicle VA. The rear camera takes an image of a region on a front side of the vehicle VA. The left side camera takes an image of a region on a left side of the vehicle VA. The right side camera takes an image of a region on a right side of the vehicle VA.

The plurality of sonars 32 include a front sonar, a rear sonar, a left side sonar, and a right side sonar. Each of the plurality of sonars 32 transmits a sound wave to a region described below, and receives a reflected wave of the sound wave reflected by an object. Each of the sonars 32 transmits information (that is, sonar data) on the transmitted sound wave and the received reflected wave to the parking ECU 30 each time a predetermined period elapses. The front sonar, the rear sonar, the left side sonar, and the right side sonar transmit the sound waves to a region on the front side of the vehicle VA, a region on the front side of the vehicle VA, a region on the left side of the vehicle VA, and a region on the right side of the vehicle VA, respectively.

The drive ECU 40 is connected to an accelerator pedal operation amount sensor 41 and a drive source actuator 42.

The accelerator pedal operation amount sensor 41 detects an accelerator pedal operation amount AP being an operation amount of an accelerator pedal 41a, and outputs a signal indicating the accelerator pedal operation amount AP. The drive ECU 40 acquires the accelerator pedal operation amount AP based on the signal generated by the accelerator pedal operation amount sensor 41. The accelerator pedal 41a is sometimes referred to as "accelerator."

The drive source actuator 42 is connected to a drive source (such as an electric motor and an internal combustion engine) 42a that generates a driving force to be applied to the vehicle VA. The drive source 42a is sometimes referred to as "drive device." The drive ECU 40 controls the drive source actuator 42 to change an operation state of the drive source 42*a*, to thereby adjust the driving force to be applied to the vehicle VA. The drive ECU 40 controls the drive source actuator 42 such that the driving force applied to the vehicle increases as the accelerator pedal operation amount AP increases.

In the case in which the drive source 42*a* is in the non-actuation state, when any one of the following condition S1 and condition S2 is satisfied, the startup condition is satisfied. When the startup condition is satisfied, the drive source 42*a* is started up, and the state of the drive source 42*a* is changed from the non-actuation state to the actuation state. The drive source 42*a* in the actuation state can generate the driving force for the vehicle VA. The drive source 42*a* in the non-actuation state cannot generate the driving force for the vehicle VA.

Condition S1: A condition satisfied when the electronic key 26 is present inside the vehicle, the key matching is successful, and the IG switch 28 is operated.

Condition S2: A condition satisfied when the electronic key 26 is present outside the vehicle, the key matching is successful, and the startup operation described below is executed on the portable terminal 27.

Meanwhile, when the IG switch 28 is operated in the case in which the drive source 42*a* is in the actuation state, the state of the drive source 42*a* is changed from the actuation state to the non-actuation state. The state in which the drive source 42*a* is in the actuation state is referred to as "ignition on." The state in which the drive source 42*a* is in the non-actuation state is referred to as "ignition off."

In the ignition-off state, the matching ECU 20, the antennas 21 to 24, the door lock device 29 are activated, and the DCU 25 and the ECUs 30 and 40 are not activated. The vehicle-outside reception antenna 22 can receive the response signal from the electronic key 26 even when the DCU 25 is not activated. Further, in the ignition-on state, all of the matching ECU 20, the antennas 21 to 24, the DCU 25, and the ECUs 30 and 40 are activated.

Further, the present control device 10 includes an in-vehicle battery 50. In the ignition-on state, the in-vehicle battery 50 is charged through use of the driving force generated by the drive source 42*a* and a braking force generated by a brake device (not shown), and is not charged in the ignition-off state. The in-vehicle battery 50 supplies electric power to the matching ECU 20, the DCU 25, the parking ECU 30, and the drive ECU 40.

(Overview of Operation)

The vehicle control system according to this embodiment is configured to be capable of achieving control (remote operation control) of using the present control device 10 and the portable terminal 27 to cause the vehicle VA to travel to a predetermined target stop position (target position) based on the operation of the portable terminal 27 by the user existing outside the vehicle. In order for the remote operation control to be executed, the data communication is required between the portable terminal 27 and the DCU 25. However, in the ignition-off state, the DCU 25 is in the inactivated state so that the electric power of the in-vehicle battery 50 is not wastefully consumed. Thus, in this state, the remote operation control cannot be started.

To deal with this problem, the present control device 10 monitors whether or not the activation condition is satisfied in the ignition-off state. The activation condition is satisfied when both of the following condition T1 and condition T2 are satisfied.

Condition T1: A condition satisfied when the vehicle-outside reception antenna 22 receives the response signal transmitted by the electric key 26.

Condition T2: A condition satisfied when the key ID included in the response signal received by the vehicle-outside reception antenna 22 matches the vehicle unique ID.

Figure 2:
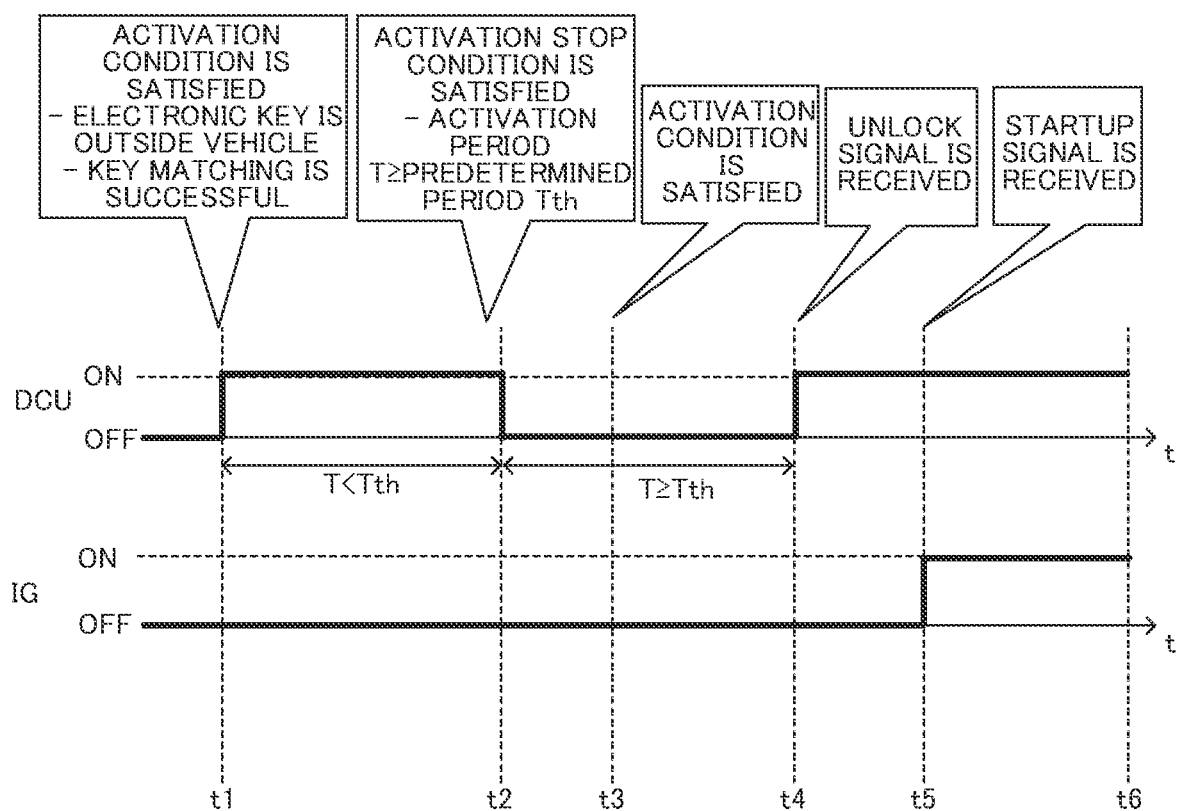
FIG. 2 is a timing chart for illustrating an overview of an operation of the present disclosure.

At a time t1 of FIG. 2, when the present control device 10 determines that the activation condition is satisfied, the present control device 10 activates the DCU 25, to thereby change the state of the DCU 25 to the activated state. When the state of the DCU 25 is changed to the activated state, the DCU 25 establishes the wireless communication connection with the portable terminal 27.

After the wireless communication connection is established, when the user executes a predetermined startup operation on the portable terminal 27, the portable terminal 27 transmits the startup signal (hereinafter also referred to as "startup instruction"), and the DCU 25 receives the startup signal. When the DCU 25 receives the startup signal, the present control device 10 starts up the drive source 42*a*, to thereby change the state of the drive source 42*a* to the actuation state (that is, the state of the vehicle VA is changed from the ignition-off state to the ignition-on state).

When the activation condition is satisfied, and the DCU 25 is thus activated, the drive source 42*a* is in the non-actuation state, and the DCU 25 is in the activated state. In this case, when the user does not intend to start the remote operation control, and does not thus execute the startup operation on the portable terminal 27, the DCU 25 wastefully consumes the electric power, and the charged electric power of the in-vehicle battery 50 may be exhausted.

Thus, the present control device 10 monitors whether or not an activation stop condition is satisfied after the time t1 (hereinafter also referred to as "activation time") at which the DCU 25 is activated. The activation stop condition is satisfied when an activation period T (that is, an elapsed period T since the time t1) indicating a period in which the DCU 25 is in the activated state reaches a predetermined period Tth in the case in which the drive source 42*a* is in the non-actuation state.

In this example, it is assumed that the activation stop condition is satisfied at a time t2. At the time t2 at which the activation stop condition is satisfied, the present control device 10 stops the activation of the DCU 25, to thereby change the state of the DCU 25 from the activated state to the inactivated state.

Further, after the time t2, even when the activation condition is satisfied (see a time t3), the activation period T is equal to or longer than the predetermined period Tth, the present control device 10 thus inhibits the activation of the DCU 25. However, in a case in which the vehicle-outside reception antenna 22 receives the unlock signal transmitted by the electronic key 26 when the user operates the unlock button 26B of the electronic key 26 after the time t2 (see a time t4), the present control device 10 activates the DCU 25. In this case, at the time t4, the present control device 10 resets the activation period T. The DCU 25 receives the startup signal from the portable terminal 27 at a time t5 before the activation period T reaches the predetermined period Tth since the time t4, and the present control device 10 starts up the drive source 42*a*.

The present control device 10 provides the following effects.

(1) When a user carrying the electronic key 26 having the assigned key ID matching the vehicle unique ID (user holding legitimate qualification for driving the vehicle VA (hereinafter referred to as "legitimate user")) exists within the communication possible range, the activation condition is satisfied, and the DCU 25 is thus activated. As a result, the present control device 10 can confirm, without requiring an operation of the user, that the user existing within the communication possible range is the legitimate user, and, when the user is the legitimate user, can activate the DCU 25 without requiring a special operation. When the DCU 25 is activated, the DCU 25 can wirelessly communicate with the portable terminal 27, and the user can start the remote operation control by only operating the portable terminal 27 without operating the electronic key 26.

(2) When the activation period T reaches the predetermined period Tth, the activation stop condition is satisfied, and the activation of the DCU 25 is stopped. When the activation stop condition is satisfied, the user who does not intend to start the remote operation control is highly likely to exist within the communication possible range. In this case, the activation of the DCU 25 is stopped, and it is thus possible to prevent the DCU 25 from wastefully consuming the electric power when the drive source 42*a* is in the non-actuation state.

(3) When the activation stop condition is satisfied, the activation of the DCU 25 is inhibited even when the activation condition is satisfied. Therefore, even when the user who does not intend to start the remote operation control continues to exist within the communication possible range, and the activation condition is thus consequently satisfied again, the DCU 25 is not activated. As a result, it is possible to prevent the DCU 25 from wastefully consuming the electric power when the drive source 42*a* is in the non-actuation state.

(4) After the activation stop condition is satisfied, when the vehicle-outside reception antenna 22 receives the unlock signal, the DCU 25 is activated. Even when the user intends to start the remote operation control, but the state of the drive source 42*a* is not changed to the actuation state before the activation period T reaches the predetermined period Tth, the user operates the unlock button 26B of the electronic key 26, to thereby be able to activate the DCU 25. As a result, even when the activation of the DCU 25 is temporarily stopped, the user can start the remote operation control while staying outside the vehicle.

Operation Example

Figure 3A:
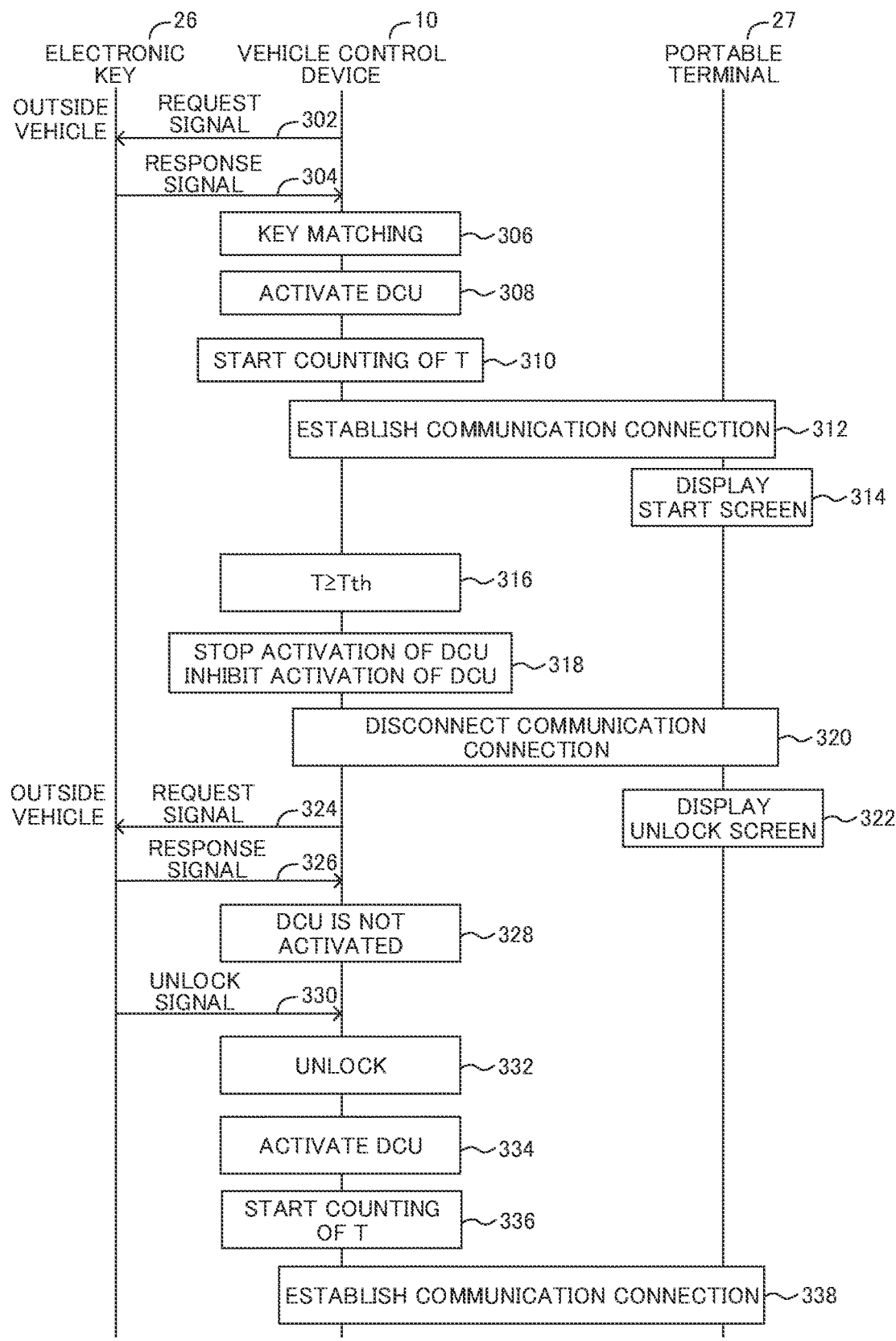
FIG. 3A is a sequence diagram of an electronic key, a remote control device, and a portable terminal.
Figure 3B:
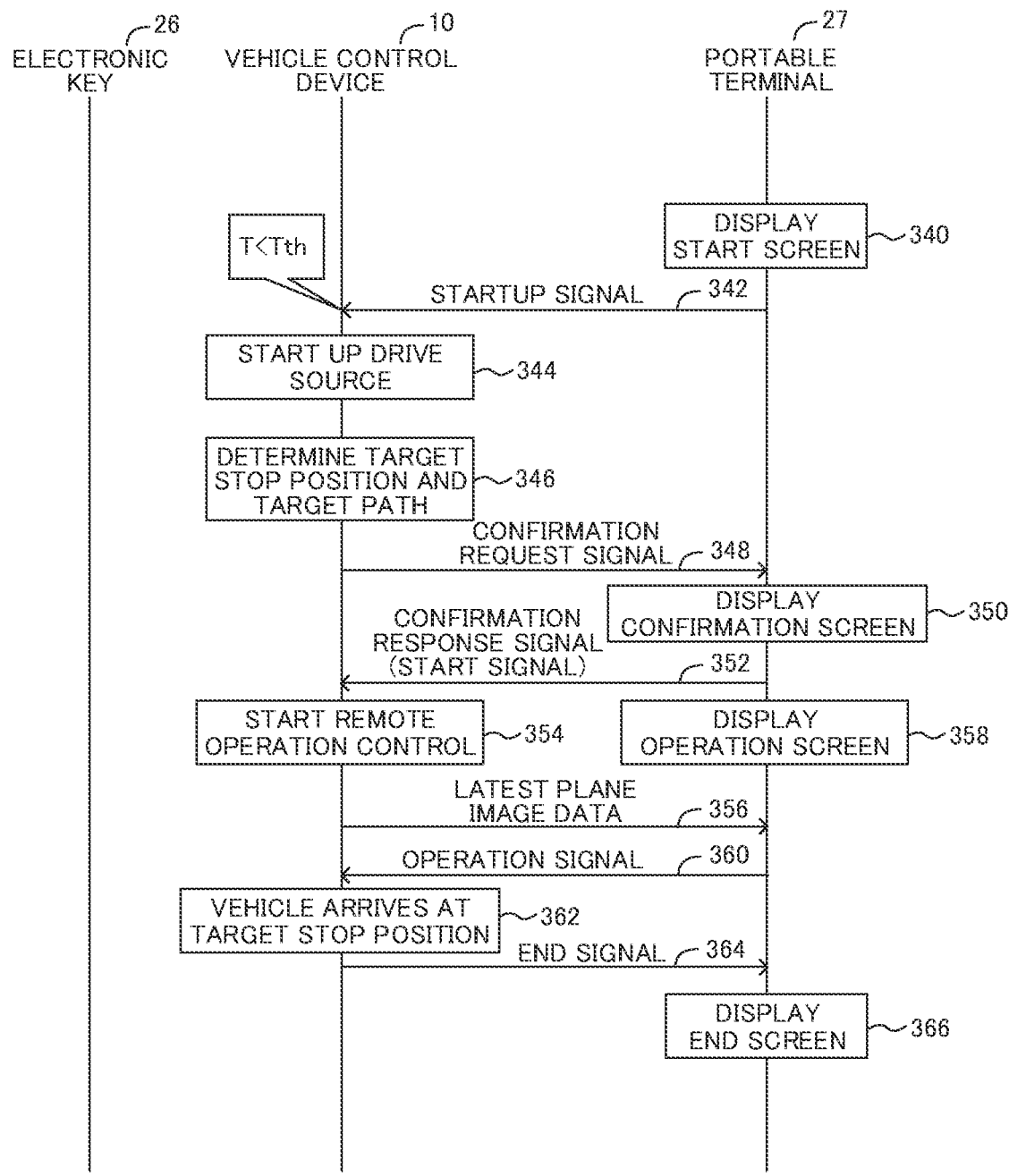
FIG. 3B is a sequence diagram of the electronic key, the remote control device, and the portable terminal.

With reference to FIG. 3A and FIG. 3B, a specific description is given of an operation of the present control device 10, the electronic key 26, and the portable terminal 27.

In the ignition-off state (that is, when the drive source 42*a* is in the non-actuation state), the present control device 10 transmits the request signal from the vehicle-outside transmission antenna 21 and the vehicle-inside transmission antenna 23 each time a predetermined period elapses (Step 302). It is assumed that the user exists outside the vehicle, the electronic key 26 and the portable terminal 27 also exist outside the vehicle, and a remote control application program of the portable terminal 27 is activated. When the user exists within the communication possible range, the electronic key 26 receives the request signal, and transmits the response signal including the key ID assigned in advance (Step 304).

When the vehicle-outside reception antenna 22 receives the response signal, the present control device 10 executes the key matching (Step 306). When the key matching is successful, the present control device 10 determines that the activation condition is satisfied. The present control device 10 thus activates the DCU 25 (Step 308), and starts the counting of the activation period T (Step 310). After the DCU 25 is activated, the wireless communication connection is established between the DCU 25 and the portable terminal 27 (Step 312). When the wireless communication connection is established, the portable terminal 27 displays a start screen 400 of FIG. 4A on a display 270 of the portable terminal 27 (see FIG. 4A to FIG. 4E) (Step 314). The display 270 is a display device of a touch panel type.

Figure 4A:
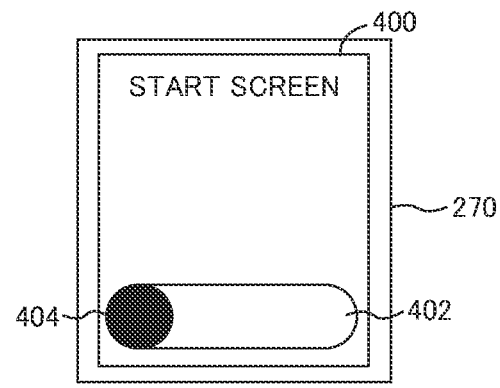
FIG. 4A is an explanatory diagram of a start screen displayed on the portable terminal.

As illustrated in FIG. 4A, the start screen 400 includes a slide operation region 402. In an initial state of the start screen 400, an operation display element 404 is positioned at a left end of the slide operation region 402. When the user outside the vehicle operates the portable terminal 27 in such a manner as to slide the operation display element 404 to a right end of the slide operation region 402, the portable terminal 27 determines that a predetermined startup operation has been executed, and transmits a startup signal to the DCU 25.

In an example of FIG. 3A, it is assumed that the user does not execute the startup operation even when the activation period T reaches the predetermined period Tth. In this case, the present control device 10 determines that the activation stop condition is satisfied when the activation period T reaches the predetermined period Tth (Step 316), stops the activation of the DCU 25, and inhibits the activation of the DCU 25 even when the activation condition is satisfied (Step 318).

When the activation of the DCU 25 is stopped, the wireless communication connection between the DCU 25 and the portable terminal 27 is disconnected (Step 320). When the portable terminal 27 detects the disconnection of the wireless communication connection, the portable terminal 27 displays a reconnection screen 405 of FIG. 4B on the display 270 (Step 322).

Figure 4B:
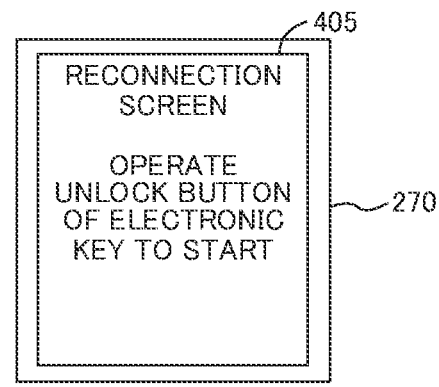
FIG. 4B is an explanatory diagram of a reconnection screen displayed on the portable terminal.

As illustrated in FIG. 4B, on the reconnection screen 405, there is displayed a message for prompting the user to execute an operation (operation of the unlock button 26B) required to reactivate the DCU 25.

The electronic key 26 outside the vehicle receives "the request signal transmitted from the vehicle-outside transmission antenna 21 in Step 324," and transmits the response signal in response to the request signal (Step 326). When the present control device 10 receives the response signal, the present control device 10 executes the key matching. Even when the key matching is successful and the activation condition is thus established, the activation period T is equal to or longer than the predetermined period Tth, and the present control device 10 does not thus activate the DCU 25, and maintains the state of the DCU 25 in the inactivated state (Step 328).

After that, when the user operates the unlock button 26B of the electronic key 26 existing outside the vehicle, the electronic key 26 transmits the unlock signal including the key ID (Step 330). When the present control device 10 receives the unlock signal, the present control device 10 executes the key matching. When the key matching is successful, the present control device 10 causes the door lock device 29 to unlock the door of the vehicle VA (Step 332), and activates the DCU 25 (Step 334). Further, the present control device 10 activates the DCU 25, then resets the activation period T (that is, sets the activation period T to "0"), and starts the counting of the activation period T (Step 336). After that, the wireless communication connection is established between the DCU 25 and the portable terminal 27 (Step 338).

With reference to FIG. 3B, description is now given of processing executed after the wireless communication connection is established in Step 338.

When the wireless communication connection is established, the portable terminal 27 displays the start screen 400 on the display 270 (Step 340).

It is assumed that the user executes the startup operation before the predetermined period Tth elapses after the DCU 25 is activated in Step 334 of FIG. 3A. The portable terminal 27 transmits the startup signal when the startup operation is executed (Step 342 of FIG. 3B). When the DCU 25 receives the startup signal, the DCU 25 starts up the drive source 42a, to thereby change the state of the drive source 42a from the non-actuation state to the actuation state (Step 344). When the state of the drive source 42a is changed to the actuation state, the present control device 10 resets the activation period T, and does not count the activation period T after that.

When the drive source 42a is an internal combustion engine, a starter motor (not shown) rotates a crankshaft of the internal combustion engine, to thereby start up the internal combustion engine. Meanwhile, when the drive source 42a is an electric motor, a relay circuit (not shown) is controlled so that the drive source 42a is changed from "a non-current supply state in which electrical connection between the electric motor and a battery (not shown) is shut off" to "a current supply state in which the electric motor and the battery (not shown) are electrically connected to each other," to thereby start up the electric motor. When the drive source 42a is formed of an internal combustion engine and an electric motor (when the vehicle VA is a hybrid vehicle), the electric motor that generates at least a driving force for starting the vehicle is started up.

Further, the present control device 10 determines the target stop position and a target path based on the image data and the sonar data (Step 346). After that, the present control device 10 transmits a confirmation request signal to the portable terminal 27 (Step 348). The confirmation request signal includes image data relating to "a confirmation image generated based on the image data generated by the plurality of cameras 31." The confirmation image is an image formed by plotting (superimposing) the target stop position and the target path on "a plane image at the time when a region within a predetermined range from the vehicle VA is viewed from directly above."

Figure 4C:
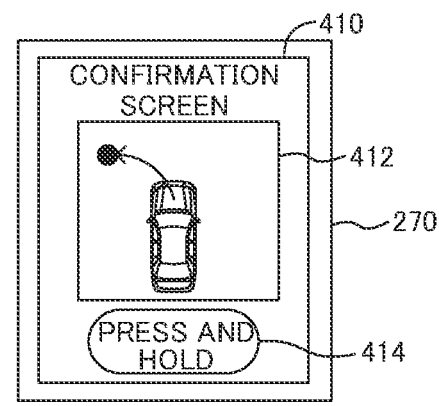
FIG. 4C is an explanatory diagram of a confirmation screen displayed on the portable terminal.

When the portable terminal 27 receives the confirmation request signal, the portable terminal 27 displays a confirmation screen 410 of FIG. 4C on the display 270 (Step 350). As illustrated in FIG. 4C, the confirmation screen 410 includes a stop position display region 412 and a press-and-hold button 414. In the stop position display region 412, the confirmation image is displayed. When the user views the confirmation image displayed in the stop position display region 412, and accepts the target stop position and the target path, the user touches the press-and-hold button 414. When the press-and-hold button 414 is touched for a period equal to or longer than a predetermined period, the portable terminal 27 determines that the predetermined start operation has been executed, and transmits a confirmation response signal (start signal) to the DCU 25 (Step 352).

Figure 4D:
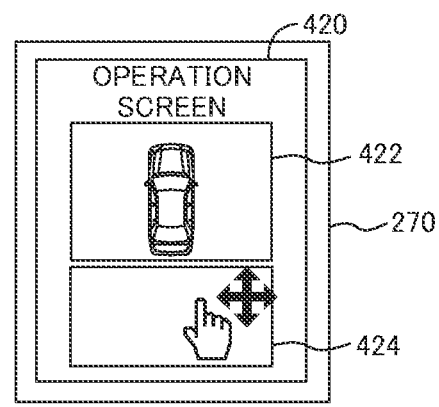
FIG. 4D is an explanatory diagram of an operation screen displayed on the portable terminal.

When the DCU 25 receives the confirmation response signal, the present control device 10 starts remote operation control (Step 354). The present control device 10 transmits the latest plane image data to the portable terminal 27 each time a predetermined period elapses during the execution of the remote operation control (Step 356). When the start operation is executed on the confirmation screen 410, the portable terminal 27 displays an operation screen 420 (see FIG. 4D) on the display 270 (Step 358). As illustrated in FIG. 4D, the operation screen 420 includes a plane image display region 422 and an operation region 424. In the plane image display region 422, there is displayed a plane image based on the latest plane image data received by the portable terminal 27. The image displayed in the plane image display region 422 is updated each time the latest plane image data is received. When the user is tracing the operation region 424 with the finger, and the touched position in the operation region 424 is thus continuously changing, the portable terminal 27 continues to transmit an operation signal (hereinafter sometimes referred to as "movement instruction") to the DCU 25 each time a predetermined period elapses (Step 360). Such operation on the operation region 424 by the user is sometimes referred to as "movement operation."

When the present control device 10 once starts the remote operation control, the present control device 10 causes the vehicle VA to travel along the target path as long as the operation signal is received until the vehicle VA arrives at the target stop position. When the vehicle VA arrives at a deceleration start position being a position before the target stop position by a predetermined distance along the target path, the present control device 10 starts decelerating the vehicle VA, and stops the vehicle VA at the target stop position.

When the present control device 10 determines that the vehicle VA arrives at the target stop position (Step 362), the present control device 10 transmits an end signal to the portable terminal 27 (Step 364).

Figure 4E:
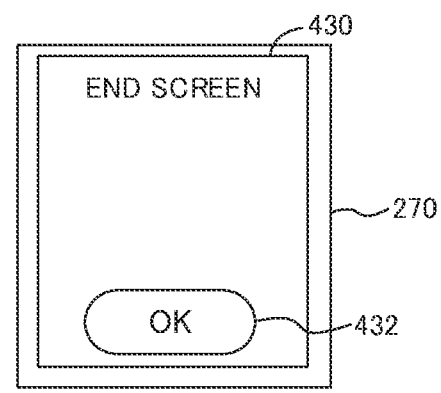
FIG. 4E is an explanatory diagram of an end screen displayed on the portable terminal.

When the portable terminal 27 receives the end signal, the portable terminal 27 displays an end screen 430 (see FIG. 4E) on the display 270. As illustrated in FIG. 4E, the end screen 430 includes an OK button 432. When the OK button 432 is operated, the portable terminal 27 finishes the remote control application program. The user can recognize that the vehicle VA arrives at the target stop position, and the remote operation control has thus been finished when the end screen 430 is displayed.

The user gets in the vehicle VA stopping at the target stop position. The user, who has gotten in the vehicle VA, drives the vehicle VA inside the vehicle.

(Specific Operation)

<Key Matching Routine>

The CPU of the matching ECU 20 ("CPU" hereinafter refers to the CPU of the matching ECU 20 unless otherwise specified) executes a key matching routine illustrated in a flowchart of FIG. 5 each time a predetermined period elapses. The matching ECU 20 is activated even in the ignition-off state, and thus the CPU also executes this routine irrespective of whether the state is the ignition-off state or the ignition-on state.

Figure 5:
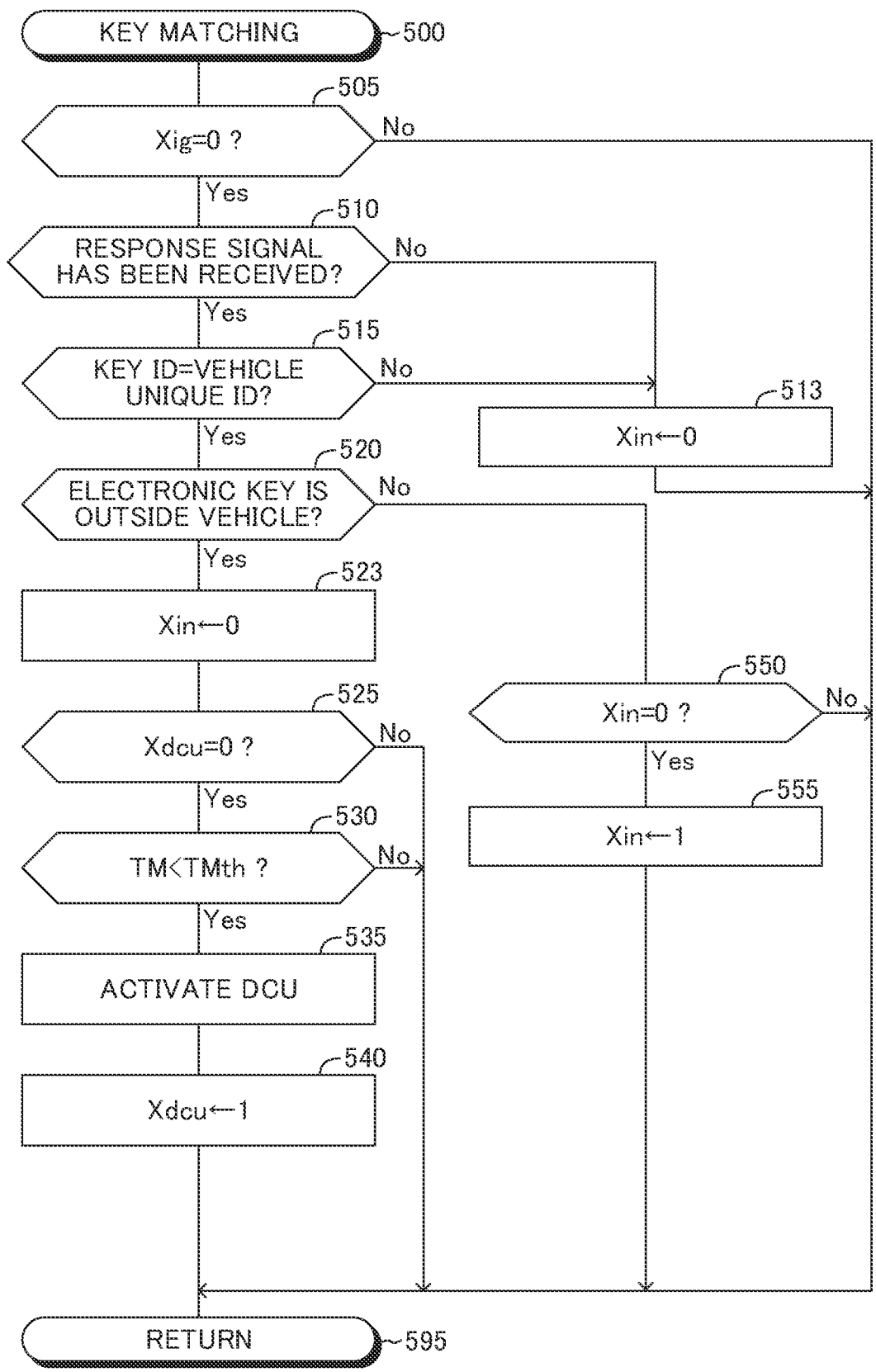
FIG. 5 is a flowchart for illustrating a key matching routine executed by a CPU of a matching ECU.
Figure 9:
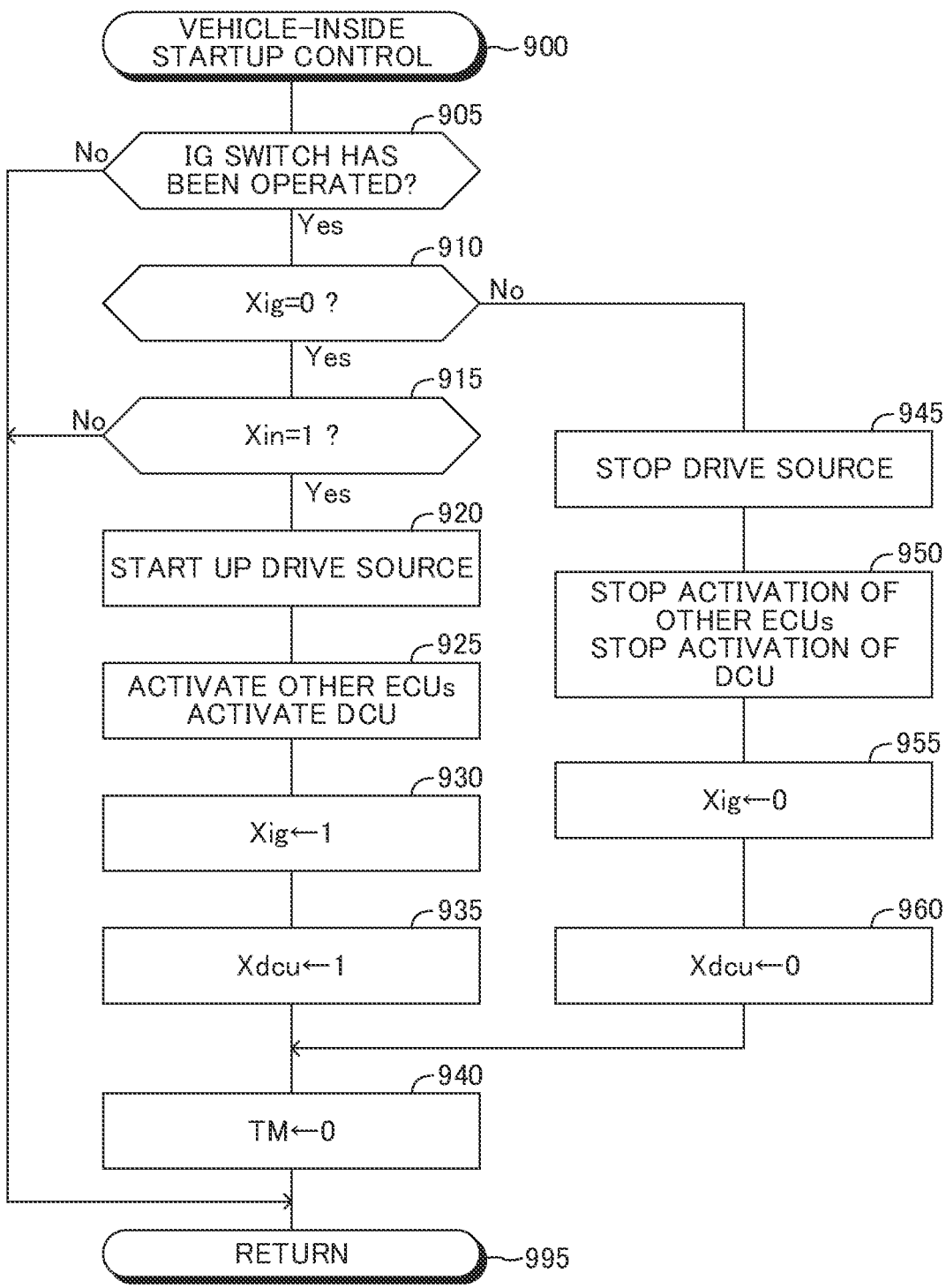
FIG. 9 is a flowchart for illustrating a vehicle-inside startup control routine executed by the CPU of the matching ECU.

Thus, the CPU starts processing from Step 500 of FIG. 5 at a predetermined timing, proceeds to Step 505, and determines whether or not the value of an ignition flag Xig is "0." The value of the ignition flag Xig is set to "1" in the ignition-on state (see Step 720 of FIG. 7 and Step 930 of FIG. 9), and is set to "0" in the ignition-off state (see Step 955 of FIG. 9).

When the value of the ignition flag Xig is "0," the CPU makes a determination of "No" in Step 505, proceeds to Step 595, and temporarily finishes this routine.

Meanwhile, when the value of the ignition flag Xig is "1," the CPU makes a determination of "Yes" in Step 505, and proceeds to Step 510. In Step 510, the CPU determines whether or not the response signal has been received from the electronic key 26 in a period from a time when this routine has been previously executed to the current time.

When the CPU does not receive the response signal in the above-mentioned period, the CPU makes a determination of "No" in Step 510, proceeds to Step 513, sets the value of a vehicle-inside flag Xin to "0," proceeds to Step 595, and temporarily finishes this routine.

The value of the vehicle-inside flag Xin is set to "1" (see Step 555 described below) when the electronic key 26 exists inside the vehicle and the key matching for the key ID of the electronic key 26 is successful (see Step 555 described below). The value of the vehicle-inside flag Xin is set to "0" when the response signal has not been received, when the electronic key 26 exists inside the vehicle and the key matching fails, or when the electronic key 26 exists outside the vehicle (see Step 513 and Step 523 described below).

Meanwhile, when the CPU has received the response signal in the above-mentioned period, the CPU makes a determination of "Yes" in Step 510, and proceeds to Step 515. In Step 515, the CPU determines whether or not the key ID included in the received response signal and the vehicle unique ID match each other.

When the key ID and the vehicle unique ID do not match each other, the CPU makes a determination of "No" in Step 515. Then, the CPU executes Step 513, proceeds to Step 595, and temporarily finishes this routine.

Meanwhile, when the key ID and the vehicle unique ID match each other, the CPU makes a determination of "Yes" in Step 515, and proceeds to Step 520. In Step 520, the CPU determines whether or not the electronic key 26 that has transmitted the response signal is outside the vehicle. More specifically, when the vehicle-outside reception antenna 22 has received the response signal, the CPU determines that the electronic key 26 is present outside the vehicle. When the vehicle-inside reception antenna 24 has received the response signal, the CPU determines that the electronic key 26 is present inside the vehicle.

When the electronic key 26 exists outside the vehicle, the CPU determines that the activation condition is satisfied. In this case, the CPU makes a determination of "Yes" in Step 520, proceeds to Step 523, sets the value of the vehicle-inside flag Xin to "0," and proceeds to Step 525. In Step 525, the CPU determines whether or not the value of an activation flag Xdcu is "0."

The value of the activation flag Xdcu is set to "1" when the DCU 25 is in the activated state (see Step 540 described below, Step 830 of FIG. 8, and Step 935 of FIG. 9). The value of the activation flag Xdcu is set to "0" when the DCU 25 is in the inactivated state (Step 630 of FIG. 6 and Step 960 of FIG. 9 described below).

When the value of the activation flag Xdcu is "0," the CPU makes a determination of "Yes" in Step 525, proceeds to Step 530, and determines whether or not the value of a timer TM for counting the activation period T is smaller than a threshold value TMth. The threshold value TMth is set in advance to such a value that the value of the timer TM reaches the threshold value TMth when the activation period T reaches the predetermined period Tth. Thus, in Step 530, the CPU determines whether or not the activation period T has not reached the predetermined period Tth. The timer TM is set to "0," for example, when the drive source 42*a* is changed from the non-actuation state to the actuation state, or is changed from the actuation state to the non-actuation state (see Step 725 of FIG. 7 and Step 940 of FIG. 9 described below).

When the value of the timer TM is smaller than the threshold value TMth (that is, the activation period T has not reached the predetermined period Tth), the CPU makes a determination of "Yes" in Step 530, and executes processing in Step 535 and Step 540 in this order.

Step 535: The CPU activates the DCU 25.
Step 540: The CPU sets the value of the activation flag Xdcu to "1."

After the CPU executes the processing in Step 540, the CPU proceeds to Step 595, and temporarily finishes this routine.

Meanwhile, when the value of the timer TM is equal to or larger than the threshold value TMth (that is, the activation period T has reached the predetermined period Tth) at the time when the CPU proceeds to Step 530, the CPU makes a determination of "No" in Step 530, proceeds to Step 595, and temporarily finishes this routine. When the determination of "Yes" is made in Step 520, the activation condition is satisfied. However, when the activation period T has reached the predetermined period Tth, the DCU 25 is not to be activated.

When the value of the ignition flag Xig is "0," the vehicle-inside reception antenna 24 receives the response signal, and the key matching for the response signal is successful, the CPU makes a determination of "Yes" in Step 505, Step 510, and Step 515, respectively. Then, the CPU makes a determination of "No" in Step 520, and proceeds to Step 550.

In Step 550, the CPU determines whether or not the value of a vehicle-inside flag Xin is "0." When the value of the vehicle-inside flag Xin is "0," the CPU makes a determination of "Yes" in Step 550, proceeds to Step 555, and sets the value of the vehicle-inside flag Xin to "1." After that, the CPU proceeds to Step 595, and temporarily finishes this routine. Meanwhile, when the value of the vehicle-inside flag Xin is "1," the CPU makes a determination of "No" in Step 550, proceeds to Step 595, and temporarily finishes this routine.

<Activation Stop Condition Determination Routine>

Figure 6:
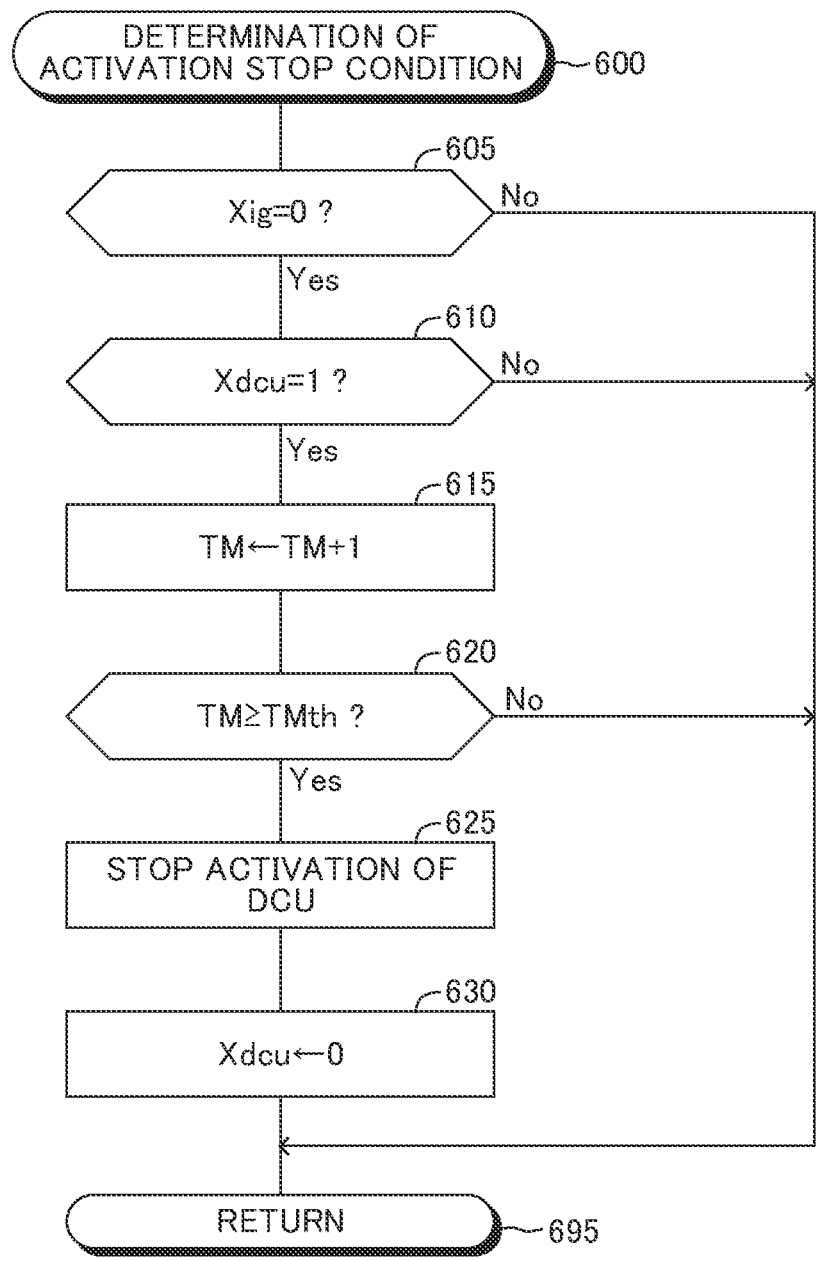
FIG. 6 is a flowchart for illustrating an activation stop condition determination routine executed by the CPU of the matching ECU.

The CPU executes an activation stop condition determination routine of FIG. 6 illustrated as a flowchart each time a predetermined period elapses. The CPU executes this routine irrespective of whether the state is the ignition-off state or the ignition-on state.

Thus, the CPU starts processing from Step 600 of FIG. 6 at a predetermined timing, proceeds to Step 605, and determines whether or not the value of the ignition flag Xig is "0."

When the value of the ignition flag Xig is "0," the CPU makes a determination of "Yes" in Step 605, proceeds to Step 610, and determines whether or not the value of the activation flag Xdcu is "1." When the value of the activation flag Xdcu is "1," the CPU makes a determination of "Yes" in Step 610, and executes processing in Step 615 and Step 620 in this order.

Step 615: The CPU adds "1" to the value of the timer TM.
Step 620: The CPU determines whether or not the value of the timer TM is equal to or larger than the threshold value TMth.

When the value of the timer TM is smaller than the threshold value TMth, the activation period T has not reached the predetermined period Tth, and the activation stop condition is not thus satisfied. In this case, the CPU makes a determination of "No" in Step 620, proceeds to Step 695, and temporarily finishes this routine.

Meanwhile, when the value of the timer TM is equal to or larger than the threshold value TMth at the time when the CPU proceeds to Step 620, the activation period T has reached the predetermined period Tth, and the activation stop condition is thus satisfied. In this case, the CPU makes a determination of "Yes" in Step 620, and executes processing in Step 625 and Step 630 in this order. After that, the CPU proceeds to Step 695, and temporarily finishes this routine.

Step 625: The CPU stops the activation of the DCU 25.
Step 630: The CPU sets the value of the activation flag Xdcu to "0."

When the CPU proceeds to Step 605, and the value of the ignition flag Xig is "1," the CPU makes a determination of "No" in Step 605, proceeds to Step 695, and temporarily finishes this routine.

When the CPU proceeds to Step 610, and the value of the startup flag Xdcu is "0," the CPU makes a determination of "No" in Step 610, proceeds to Step 695, and temporarily finishes this routine.

<Vehicle-Outside Startup Control Routine>

Figure 7:
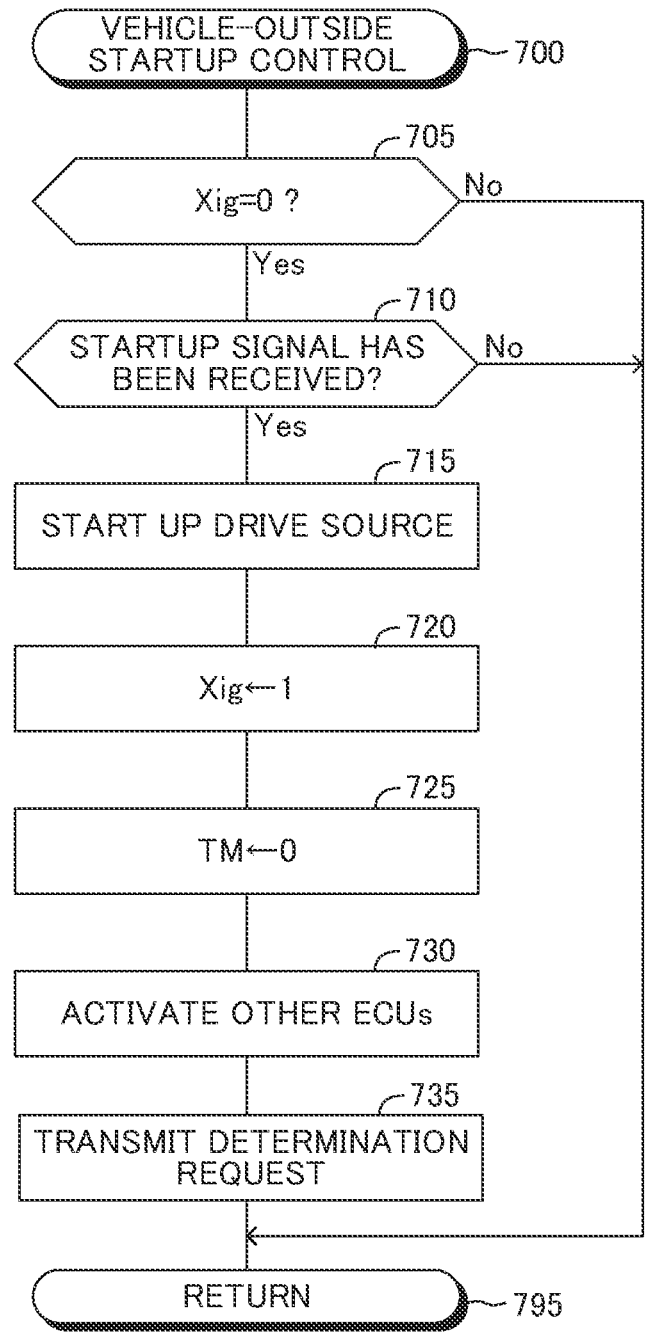
FIG. 7 is a flowchart for illustrating a vehicle-outside startup control routine executed by the CPU of the matching ECU.

The CPU executes a vehicle-outside startup control routine of FIG. 7 illustrated as a flowchart each time a predetermined period elapses. The CPU executes this routine irrespective of whether the state is the ignition-off state or the ignition-on state.

Thus, the CPU starts processing from Step 700 of FIG. 7 at a predetermined timing, proceeds to Step 705, and determines whether or not the value of the ignition flag Xig is "0."

When the value of the ignition flag Xig is "0," the CPU makes a determination of "Yes" in Step 705, and proceeds to Step 710. In Step 710, the CPU determines whether or not the DCU 25 has received the startup signal from the portable terminal 27 in a period from a time when this routine has been previously executed to the current time.

When the DCU 25 has not received the startup signal in that period, the CPU makes a determination of "No" in Step 710, proceeds to Step 795, and temporarily finishes this routine.

Meanwhile, when the DCU 25 has received the startup signal in the above-mentioned period, the CPU makes a determination of "Yes" in Step 710, and executes the processing in Step 715 to Step 735 in this order.

Step 715: The CPU starts up the drive source 42a.
Step 720: The CPU sets the value of the ignition flag Xig to "1."
Step 725: The CPU sets the value of the timer TM to "0."
Step 730: The CPU activates the parking ECU 30 and the drive ECU 40.

When the parking ECU 30 and the drive ECU 40 are activated, various types of processing become executable.

Step 735: The CPU transmits, to the parking ECU 30, a determination request for causing the parking ECU 30 to determine the target stop position and the target path.

When the parking ECU 30 receives the determination request, the parking ECU 30 determines the target stop position and the target path based on the image data and the sonar data, and transmits the confirmation request signal to the portable terminal 27 (see Step 348 of FIG. 3B). When the DCU 25 receives the confirmation response signal from the portable terminal 27, the parking ECU 30 starts the remote operation control. In the remote operation control, the parking ECU 30 transmits, to the drive ECU 40, a command for controlling the drive source actuator 42 so that the vehicle VA travels along the target path and stops at the target stop position.

After the CPU executes the processing in Step 735, the CPU proceeds to Step 795, and temporarily finishes this routine.

Meanwhile, when the CPU proceeds to Step 705, and the value of the ignition flag Xig is "1," the CPU makes a determination of "No" in Step 705, proceeds to Step 795, and temporarily finishes this routine.

<Unlock Control Routine>

Figure 8:
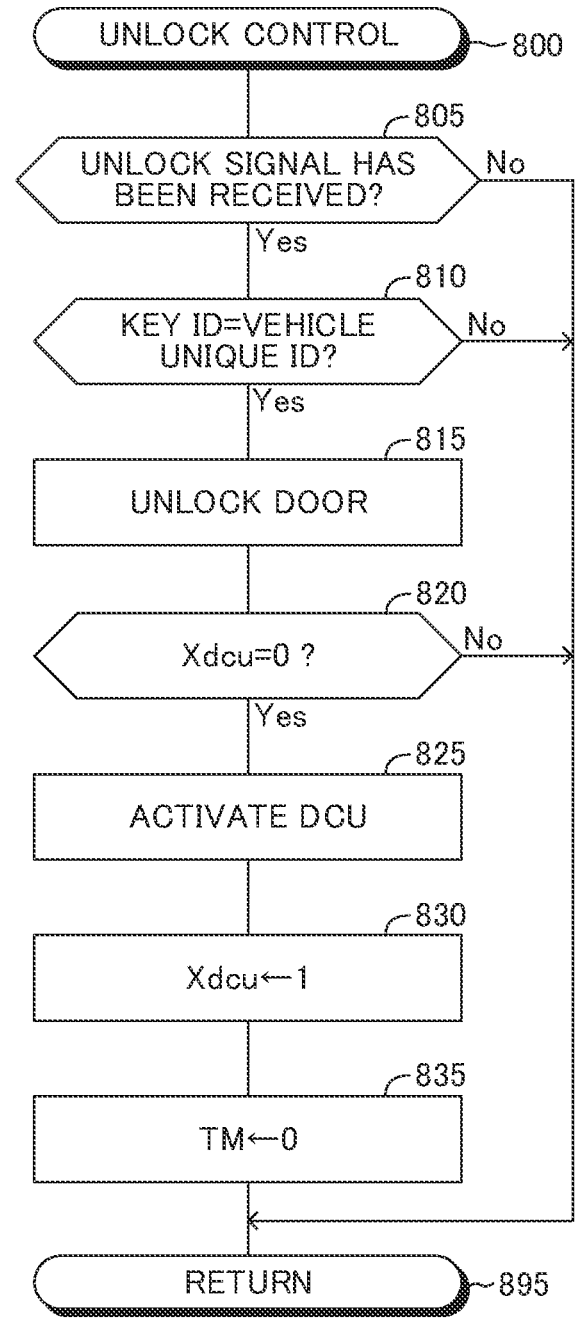
FIG. 8 is a flowchart for illustrating an unlock control routine executed by the CPU of the matching ECU.

The CPU executes an unlock control routine of FIG. 8 illustrated as a flowchart each time a predetermined period elapses. The CPU executes this routine irrespective of whether the state is the ignition-off state or the ignition-on state.

Thus, the CPU starts processing from Step 800 of FIG. 8 at a predetermined timing, proceeds to Step 805, and determines whether or not the unlock signal has been received by any one of the vehicle-outside reception antenna 22 and the vehicle-inside reception antenna 24 in a period from a time at which this routine was executed previously to the current time.

When the unlock signal is received in the above-mentioned period, the CPU makes a determination of "Yes" in Step 805, proceeds to Step 810, and determines whether or not the key ID included in the unlock signal and the vehicle unique ID match each other.

When the key ID and the vehicle unique ID match each other, the CPU makes a determination of "Yes" in Step 810, proceeds to Step 815, causes the door lock device 29 to unlock the door of the vehicle VA, and proceeds to Step 820.

In Step 820, the CPU determines whether or not the value of an activation flag Xdcu is "0." When the value of the activation flag Xdcu is "0," the CPU makes a determination of "Yes" in Step 820, and executes processing in Step 825 to Step 835 in this order.

Step 825: The CPU activates the DCU 25.
Step 830: The CPU sets the value of the activation flag Xdcu to "1."
Step 835: The CPU sets the value of the timer TM to "0."

After that, the CPU proceeds to Step 895, and temporarily finishes this routine.

After the present control device 10 receives the unlock signal, and the key matching is successful, even when the activation period T has reached the predetermined period Tth, the CPU activates the DCU 25. In this case, the value of the timer TM is set to "0" in Step 835. Thus, when the activation stop condition is subsequently satisfied in the routine of FIG. 6, the CPU stops the activation of the DCU 25, and inhibits the activation of the DCU 25 caused by the satisfied activation condition.

When none of the vehicle-outside reception antenna 22 and the vehicle-inside reception antenna 24 have received the unlock signal at the time when the CPU proceeds to Step 805, the CPU makes a determination of "No" in Step 805, proceeds to Step 895, and temporarily finishes this routine.

When the key ID and the vehicle unique ID do not match each other at the time when the CPU proceeds to Step 810, the CPU makes a determination of "No" in Step 810, proceeds to Step 895, and temporarily finishes this routine.

When the CPU proceeds to Step 810, and the value of the startup flag Xdcu is "1," the CPU makes a determination of "No" in Step 820, proceeds to Step 895, and temporarily finishes this routine.

<Vehicle-Inside Startup Control Routine>

The CPU executes a vehicle-inside startup control routine of FIG. 9 illustrated as a flowchart each time a predetermined period elapses. The CPU executes this routine irrespective of whether the state is the ignition-off state or the ignition-on state.

Thus, the CPU starts processing from Step 900 of FIG. 9 at a predetermined timing, proceeds to Step 905, and determines whether or not the IG switch 28 has been operated in a period from a time at which this routine was executed previously to the current time. When the IG switch 28 has not been operated in the above-mentioned period, the CPU makes a determination of "No" in Step 905, proceeds to Step 995, and temporarily finishes this routine.

Meanwhile, when the IG switch 28 has been operated in the above-mentioned period, the CPU makes a determination of "Yes" in Step 905, proceeds to Step 910, and determines whether or not the value of the ignition flag Xig is "0."

When the value of the ignition flag Xig is "0," the CPU makes a determination of "Yes" in Step 910, proceeds to Step 915, and determines whether or not the value of the vehicle-inside flag Xin is "1." When the value of the vehicle-inside flag Xin is "0," the condition S1 is never satisfied. Thus, the CPU makes a determination of "No" in Step 915, proceeds to Step 995, and temporarily finishes this routine.

Meanwhile, when the value of the vehicle-inside flag Xin is "1," the condition S1 is satisfied. In this case, the CPU makes a determination of "Yes" in Step 915, and executes processing in Step 920 to Step 940.

Step 920: The CPU starts up the drive source 42a.

Step 925: The CPU activates the parking ECU 30 and the drive ECU 40, and activates the DCU 25 when the DCU 25 is not activated.

Step 930: The CPU sets the value of the ignition flag Xig to "1."

Step 935: The CPU sets the value of the activation flag Xdcu to "1."

Step 940: The CPU sets the value of the timer TM to "0."

After that, the CPU proceeds to Step 995, and temporarily finishes this routine.

Meanwhile, when the value of the ignition flag Xig is "1" at the time when the CPU proceeds to Step 910, the CPU makes a determination of "No" in Step 910, and executes processing in Step 945 to Step 960 in this order.

Step 945: The CPU stops the startup of the drive source 42a, to thereby change the state of the drive source 42a from the actuation state to the non-actuation state.

Step 950: The CPU stops the activation of the parking ECU 30, the drive ECU 40, and the DCU 25.

Step 955: The CPU sets the value of the ignition flag Xig to "0."

Step 960: The CPU sets the value of the activation flag Xdcu to "0."

After that, the CPU executes processing in Step 940, proceeds to Step 995, and temporarily finishes this routine.

The present disclosure is not limited to those embodiments and modified examples, and can adopt various modified examples within the scope of the present disclosure.

First Modification Example

The activation condition is only required to be a condition that is satisfied when the legitimate user exists within the communication possible range which is outside the vehicle, and is not limited to the above-mentioned example. For example, the function of the electronic key 26 may be implemented in the portable terminal 27, and when the portable terminal 27 receives the request signal, the portable terminal 27 transmits the response signal including the key ID assigned in advance to the portable terminal 27. When the vehicle-outside reception antenna 22 receives the response signal from the portable terminal 27, and the key matching is successful, it may be determined that the activation condition is satisfied. In this example, the vehicle control system may not include the electronic key 26.

Second Modification Example

In the embodiment, the unlock signal includes the key ID, but the unlock signal may not include the key ID. In this case, when the key ID included in the response signal received from the electronic key 26 immediately before the reception of the unlock signal from the electronic key 26 and the vehicle unique ID match each other, the CPU may unlock the door of the vehicle VA, and may forcibly activate the DCU 25 even when the activation period T has reached the predetermine period Tth. Further, when the lock signal is received from the electronic key 26, the CPU may forcibly activate the DCU 25. The lock signal or the unlock signal transmitted from the electronic key for forcibly activating the DCU 25 is sometimes referred to as "specific electronic key wireless signal."

What is claimed is:

1. A vehicle control system, comprising:
a portable terminal to be operated by a user;
an electronic key configured to transmit, without an operation of the user, an electronic key wireless signal including a key identifier assigned in advance; and
a vehicle, which includes:
a Bluetooth device configured to be enabled to wirelessly communicate with the portable terminal when the Bluetooth device is in an activated state, and to be disabled to wirelessly communicate with the portable terminal when the Bluetooth device is in an inactivated state, and a drive device that includes a motor or an engine, and is configured to be enabled to generate a driving force when the drive device is in an actuation state, and to be disabled to generate the driving force when the drive device is in a non-actuation state, the vehicle being configured to change, when a predetermined startup condition is satisfied in a case in which the drive device is in the non-actuation state, a state of the drive device from the non-actuation state to the actuation state, and to automatically travel to a predetermined target position in accordance with a movement instruction received by the Bluetooth device from the portable terminal,
wherein the portable terminal is configured to transmit the movement instruction when a predetermined movement operation is executed by the user,
wherein, when the drive device is in the non-actuation state and the Bluetooth device is in the inactivated state, the vehicle is configured to monitor whether an activation condition is satisfied, the activation condition being satisfied when a user holding legitimate qualification for driving the vehicle exists within a predetermined communication possible range, which is outside the vehicle, and in which a distance from the vehicle is shorter than a predetermined distance, and to activate the Bluetooth device to change a state of the Bluetooth device from the inactivated state to the activated state when the activation condition is satisfied, and
wherein, when the drive device is in the non-actuation state, the vehicle is configured to monitor whether an activation stop condition is satisfied, the activation stop condition being satisfied when an activation period in which the Bluetooth device is in the activated state reaches a predetermined period, and to stop the activation of the Bluetooth device to change the state of the Bluetooth device from the activated state to the inactivated state when the activation stop condition is satisfied,
wherein the vehicle is configured to inhibit the activation of the Bluetooth device even when the activation condition is satisfied after the activation stop condition is satisfied, wherein the vehicle is configured to:
receive the electronic key wireless signal when the electronic key exists within the communication possible range even when the Bluetooth device is in the inactivated state;
determine, when the Bluetooth device is in the inactivated state and the electronic key wireless signal is received, whether the key identifier included in the electronic key wireless signal matches a vehicle unique identifier stored in advance; and
determine that the activation condition is satisfied when the key identifier and the vehicle unique identifier are determined to match each other,
wherein the electronic key is configured to transmit a specific electronic key wireless signal when a predetermined operation is executed by the user, and
wherein the vehicle is configured to activate the Bluetooth device to change the state of the Bluetooth device from the inactivated state to the activated state when the specific electronic key wireless signal is received after the activation stop condition is satisfied.

2. The vehicle control system according to claim 1, wherein the vehicle is configured to reset the activation period when the predetermined startup condition is satisfied and the state of the drive device is changed from the non-actuation state to the actuation state.

3. The vehicle control system according to claim 1,
wherein the portable terminal is configured to transmit a startup instruction when a predetermined startup operation is executed by the user, wherein the vehicle includes, inside the vehicle, a startup switch to be operated by the user, and
wherein the vehicle is configured to determine that the predetermined startup condition is satisfied when any one of a condition that the Bluetooth device receives the startup instruction and a condition that the startup switch is operated is satisfied in the case in which the drive device is in the non-actuation state.

4. A vehicle, comprising:
a Bluetooth device configured to be enabled to wirelessly communicate with a portable terminal when the Bluetooth device is in an activated state, and to be disabled to wirelessly communicate with the portable terminal when the Bluetooth device is in an inactivated state;
a drive device, including a motor or an engine, configured to be enabled to generate a driving force when the drive device is in an actuation state, and to be disabled to generate the driving force when the drive device is in a non-actuation state; and
a control device, including at least one processor that executes a program stored in a memory, configured to:
change, when a predetermined startup condition is satisfied in a case in which the drive device is in the non-actuation state, a state of the drive device from the non-actuation state to the actuation state, and to cause the vehicle to automatically travel to a predetermined target position in accordance with a movement instruction, which is transmitted by the portable terminal when a predetermined operation is executed on the portable terminal, and is received by the communication device,
wherein, when the drive device is in the non-actuation state and the communication device is in the inactivated state, the control device is configured to:
monitor whether an activation condition is satisfied, the activation condition being satisfied when a user holding legitimate qualification for driving the vehicle exists within a predetermined communication possible range, which is outside the vehicle, and in which a distance from the vehicle is shorter than a predetermined distance, and to activate the communication device to change a state of the communication device from the inactivated state to the activated state when the activation condition is satisfied, and
wherein, when the drive device is in the non-actuation state, the control device is configured to:
monitor whether an activation stop condition is satisfied, the activation stop condition being satisfied when an activation period in which the communication device is in the activated state reaches a predetermined period, and
stop the activation of the communication device to change the state of the communication device from the activated state to the inactivated state when the activation stop condition is satisfied,
wherein the control device is configured to inhibit the activation of the Bluetooth device even when the activation condition is satisfied after the activation stop condition is satisfied,
wherein the control device is further configured to:
receive an electronic key wireless signal when an electronic key exists within a communication possible range even when the Bluetooth device is in the inactivated state;
determine, when the Bluetooth device is in the inactivated state and the electronic key wireless signal is received, whether a key identifier included in the electronic key wireless signal matches a vehicle unique identifier stored in advance;
determine that the activation condition is satisfied when the key identifier and the vehicle unique identifier are determined to match each other;
receive a specific electronic key wireless signal transmitted from the electronic key when a predetermined operation is executed by the user; and
activate the Bluetooth device to change the state of the Bluetooth device from the inactivated state to the activated state when the specific electronic key wireless signal is received after the activation stop condition is satisfied.

* * * * *